US012800392B2

(12) United States Patent
Murray et al.

(10) Patent No.: US 12,800,392 B2
(45) Date of Patent: Nov. 17, 2026

(54) BRILLOUIN FIBER LASER SPECTROMETER

(71) Applicant: The Government of the United States of America, as represented by the Secretary of the Navy, Arlington, VA (US)

(72) Inventors: Joseph B. Murray, Ellicott City, MD (US); Brandon Redding, University Park, MD (US); Matthew J. Murray, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 20 days.

(21) Appl. No.: 19/256,442

(22) Filed: Jul. 1, 2025

(65) Prior Publication Data

US 2025/0334450 A1 Oct. 30, 2025

Related U.S. Application Data

(62) Division of application No. 18/243,728, filed on Sep. 8, 2023, now Pat. No. 12,372,406.

(51) Int. Cl.
*G01J 3/44* (2006.01)
*G01J 3/12* (2006.01)

(52) U.S. Cl.
CPC ............... *G01J 3/4412* (2013.01); *G01J 3/12* (2013.01)

(58) Field of Classification Search
CPC .......... G01J 3/4412; G01J 3/12; G01J 3/0245; G01J 9/04; G01J 3/0218
See application file for complete search history.

(56) References Cited

U.S. PATENT DOCUMENTS

2017/0248448 A1* 8/2017 Horiguchi ............. H01S 5/0085
2018/0073959 A1* 3/2018 Lecoeuche ......... G01D 5/35361
2021/0148736 A1* 5/2021 Lee ....................... H01S 3/2375

* cited by examiner

*Primary Examiner* — Tarifur R Chowdhury
*Assistant Examiner* — Akbar H. Rizvi
(74) *Attorney, Agent, or Firm* — US Naval Research Laboratory; Suresh Koshy

(57) ABSTRACT

A method, wherein an optical input signal is received. The optical input signal includes an optical signal power and an input optical spectrum. The optical input signal is split into a first optical replica of the optical input signal and a second optical replica of the optical input signal. The first optical replica of the optical input signal is transmitted through a fiber laser cavity. A portion of the at least one lasing mode is transmitted from the fiber laser cavity to an optical heterodyne receiver, and the second optical replica of the optical input signal is transmitted to the optical heterodyne receiver. An electrical output signal including an output electrical spectrum is generated. The output electrical spectrum includes a compressed replica of the input optical spectrum. A measurement of the input optical spectrum is determined based on a respective Brillouin frequency shift and at least one input frequency.

9 Claims, 9 Drawing Sheets

BRILLOUIN FIBER LASER SPECTROMETER

CROSS-REFERENCE TO RELATED APPLICATIONS

This Application claims the benefit of U.S. Provisional Application Ser. No. 63/417,345 filed on 19 Oct. 2022, the entirety of which is incorporated herein by reference. Also, this Application is a Divisional of, and claims priority to, U.S. patent application Ser. No. 18/243,728 filed on 8 Sep. 2023, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 211313-US2.

BACKGROUND OF THE INVENTION

Field of the Invention

This invention relates in general to an optical spectrum analyzer, and in particular to a fiber laser spectrometer.

Description of the Related Art

Prior art spectrum analyzers either function by scanning or spreading the spectrum in time or space with the spectrum then measured in a single shot. On the one hand, prior art scanning analyzers such as grating-based scanning spectrometers, Fourier transform infrared spectrometers ("FTIRs"), or Brillouin optical spectrum analyzers ("BOSAs") can measure at high resolution, but require slow scans to do so. On the other hand, prior art single-shot measurement devices, such as grating-based spectrographs or recently developed Rayleigh fiber backscattering based spectrometers, can capture the entire spectrum of interest, but have trade-offs between resolution and measurement range. Additionally, there exists a wide range of wavemeter architectures capable of performing high precision measurements with short acquisition times and large measurement ranges, such as those based on interferometry. However, these wavemeter architecture systems are capable of measuring only a single input frequency.

BRIEF SUMMARY OF THE INVENTION

An embodiment of the invention includes an apparatus and/or a method that enables high speed high precision spectroscopy measurements encompassing the entire telecom C-band while capturing spectra at high speed. An embodiment of the invention does not require a high precision laser for reference.

An embodiment of the invention includes an optical spectrum analyzer that relies on the linear relationship between optical frequency and the Brillouin frequency shift (BFS) in optical fiber. The Brillouin frequency, which is well characterized in optical fiber, changes by ~55 kHz per GHz of optical frequency. To measure the Brillouin frequency shift, the inventors use the unknown signal under test as a "pump" to excite Brillouin lasing in a fiber ring cavity. The cavity resonance is broken by pulsing an intensity modulator within the cavity at a repetition period matching the round-trip time in the cavity. This results in a pulsed lasing mode downshifted from the pump frequency to the peak of the Brillouin gain spectrum. This Brillouin frequency shift is proportional to the initial pump frequency with a slope in optical fiber of ~$0.55\times10^{-4}$ Hz shift per Hz of pump frequency for a pump in the range of 1550 nm. The inventors then measure the relative frequency between this Brillouin lasing mode and the original signal under test via heterodyne detection-providing a self-referenced measurement of the BFS and, thus, the absolute frequency of the signal under test. This approach effectively compresses a wideband laser input (C-band) to an RF spectrum easily managed by typical analog to digital converters (~500 MHz) without requiring scanning or a reference laser.

The difficulty of this approach then becomes measuring the BFS to a very high precision to overcome the $10^4$ conversion penalty. This approach draws from the inventors' earlier work concerning distributed Brillouin fiber laser sensors, such as described in [1], which is incorporated herein by reference. In that work, the inventors were able to reduce the uncertainty of our BFS to ~200 Hz/√Hz for a 400 m test fiber. In this context, such precision would result in ~4 MHz/VHz error in the determination of the unknown signal under test. Embodiments of the invention, for example, combine high spectral resolution (~20 MHz or ~0.16 pm in a 200 μs measurement) with a wide bandwidth (~6 THz or 48 nm—covering the entire telecom C band) and a fast measurement rate (~10 kHz). An entire system according to an embodiment of the invention is, for example, constructed using off-the-shelf fiber-coupled components, providing a compact and robust approach to optical spectrum analysis.

An embodiment of the invention includes an apparatus. The apparatus includes a spectrometer receiving an optical input signal. The optical input signal includes an input optical spectrum. The input optical spectrum includes at least one input frequency. The spectrometer is free of a pump generator generating the optical input signal; a pump generator generating an optical input signal would have a known input optical spectrum, obviating the need for a spectrometer to determine the input optical spectrum. The spectrometer outputs a measurement of the input optical spectrum. The spectrometer includes a fiber laser cavity pumped by a first optical replica of the optical input signal. The first optical replica of the optical input signal generates stimulated Brillouin scattering traveling in a direction opposite to a direction of the optical input signal. The first optical replica of the optical input signal excites at least one lasing mode in the fiber laser cavity. The at least one lasing mode respectively includes at least one lasing mode frequency. The at least one lasing mode frequency is offset by a respective Brillouin frequency shift from the respective at least one input frequency. The fiber laser cavity outputs a portion of the at least one lasing mode. The spectrometer also includes an optical heterodyne receiver receiving a second optical replica of the optical input signal and, from the fiber laser cavity, the portion of at least one lasing mode. The optical heterodyne receiver generates an electrical output signal. The electrical output signal includes an output electrical spectrum that includes a compressed, electrical replica of the input optical spectrum. The spectrometer further includes a processor receiving the electrical output signal and outputting the measurement of the input optical spectrum based on a monotonic relationship between the respective Brillouin frequency shift and the at least one input frequency.

An embodiment of the invention includes a method. An optical input signal is received. The optical input signal includes an optical signal power and an input optical spectrum. The optical input signal is split into a first optical replica of the optical input signal and a second optical replica of the optical input signal. The first optical replica of the optical input signal is transmitted through a fiber laser cavity. At least one lasing mode in the fiber laser cavity is excited using the first optical replica of the optical input signal. The at least one lasing mode respectively includes at least one lasing mode frequency. The at least one lasing mode frequency is offset by a respective Brillouin frequency shift from the respective at least one input frequency. A portion of the at least one lasing mode is transmitted from the fiber laser cavity to an optical heterodyne receiver, and the second optical replica of the optical input signal is transmitted to the optical heterodyne receiver. An electrical output signal comprising an output electrical spectrum is generated. The output electrical spectrum includes a compressed replica of the input optical spectrum. A measurement of the input optical spectrum is determined based on a monotonic relationship between the respective Brillouin frequency shift and the at least one input frequency.

An embodiment of the invention advantageously measures the absolute frequency of the input beam directly via the Brillouin frequency shift without the need for a reference laser. This is in contrast to other Brillouin spectrometers/wavemeters which use a reference laser and then use the Brillouin interaction as a filtering process.

An embodiment of the invention advantageously uses Brillouin fiber lasing to create a downshifted version of the input spectrum by breaking the cavity resonance via resonant pulsed intensity modulation.

Together, the above-mentioned advantageous features enable high precision measurements, over a broad wavelength range, at high speed without the need for a high accuracy reference laser or frequency scanning.

DETAILED DESCRIPTION OF THE INVENTION

An embodiment of the invention includes an optical spectrum analyzer apparatus 100 and is described as follows. The apparatus 100 includes a spectrometer 110 receiving an optical input signal, as shown by way of illustration in FIGS. 1-2 and 4-5. In an embodiment of the invention, the optical input signal is a pulsed optical input signal. In another embodiment of the invention, the optical input signal is a continuous wave input signal. The optical input signal includes an input optical spectrum. The input optical spectrum includes at least one input frequency. In an embodiment of the invention, input frequencies fall within the bandwidth of the spectrometer components (e.g. an illustrative EDFA, described below, that amplifies wavelengths in the range of 1530-1570 nm and illustrative circulators, described below, that work in the range of 1525-1610 nm), and the input frequencies are sufficiently separated to be resolved (e.g., a separation of on the order of GHz). The spectrometer 110 is free of a pump generator generating the optical input signal; a pump generator generating an optical input signal would have a known input optical spectrum, obviating the need for a spectrometer to determine the input optical spectrum. The spectrometer 110 outputs a measurement of the input optical spectrum.

Figure 1:
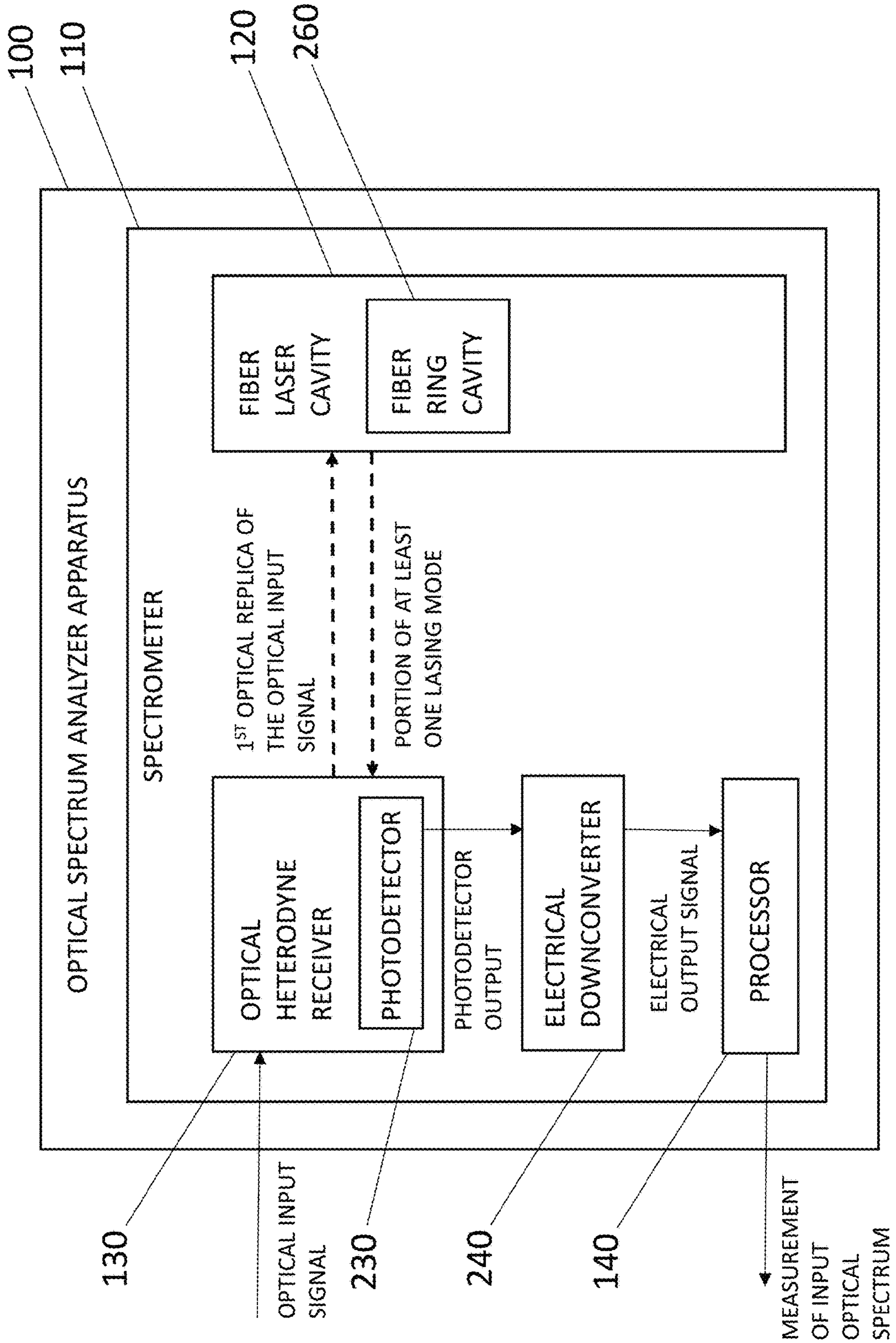
FIG. 1 is a block diagram of an embodiment of the invention.
Figure 2:
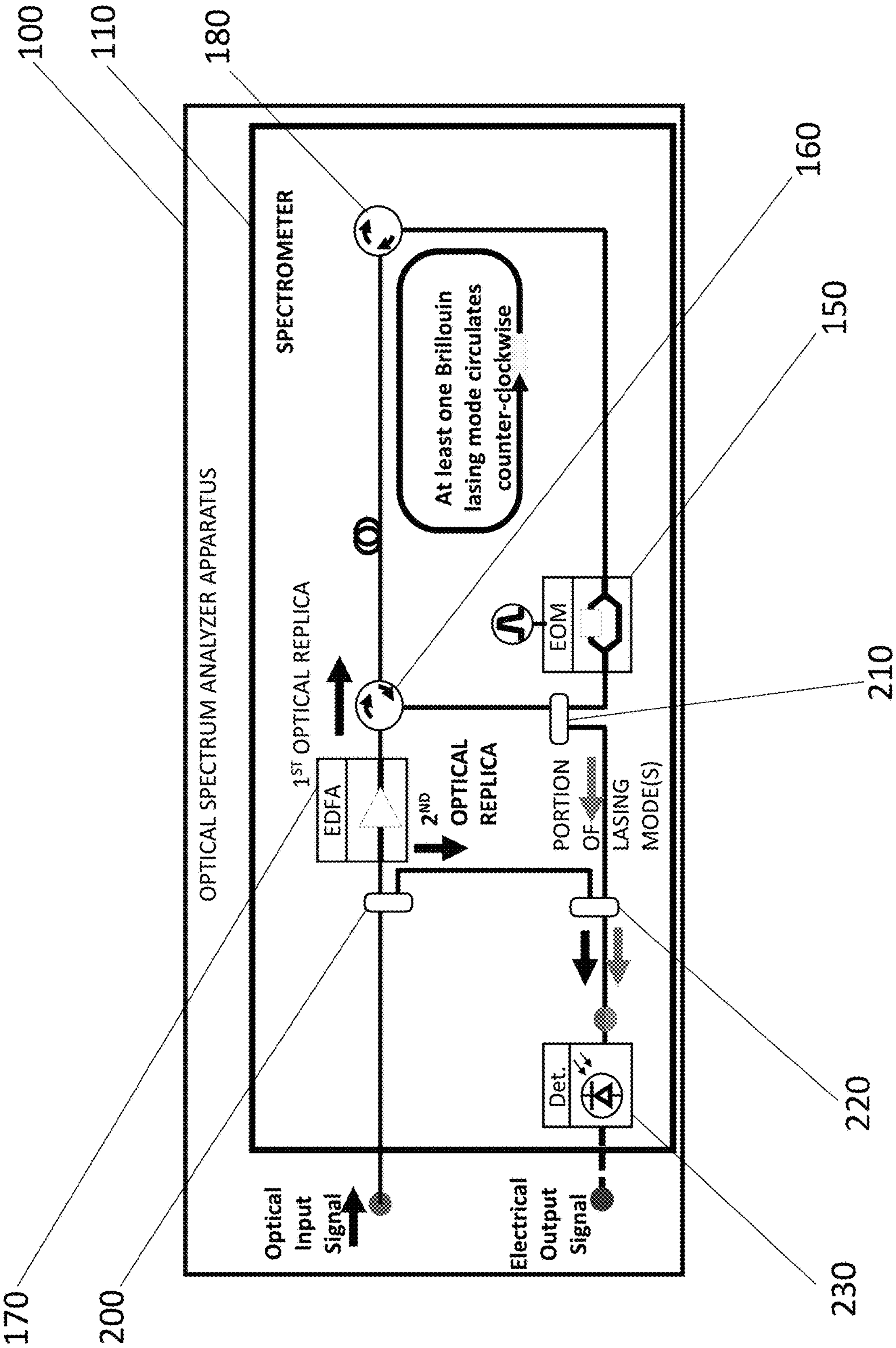
FIG. 2 is a schematic diagram of the embodiment of the invention shown in FIG. 1.

The spectrometer 110 includes a fiber laser cavity 120 pumped by a first optical replica of the optical input signal, as shown by way of illustration in FIGS. 1 and 2. The first optical replica of the optical input signal generates stimulated Brillouin scattering traveling in a direction opposite to a direction of the optical input signal, as shown by way of illustration in FIG. 2. The first optical replica of the optical input signal excites at least one lasing mode in the fiber laser cavity 120. The at least one lasing mode respectively includes at least one lasing mode frequency. The at least one lasing mode frequency is offset by a respective Brillouin frequency shift from the respective at least one input frequency. The fiber laser cavity 120 outputs a portion of the at least one lasing mode. The spectrometer 110 also includes an optical heterodyne receiver 130 receiving a second optical replica of the optical input signal and, from the fiber laser cavity 120, the portion of at least one lasing mode, as shown by way of illustration in FIGS. 1 and 2. The optical heterodyne receiver 130 generates the electrical output signal, as shown by way of illustration in FIGS. 1 and 2. The electrical output signal includes an output electrical spectrum that includes a compressed, electrical replica of the input optical spectrum. The spectrometer 110 further includes a standard processor 140 receiving the electrical output signal and outputting the measurement of the input optical spectrum based on a monotonic relationship, for example, as described below, between the respective Brillouin frequency shift and the at least one input frequency.

Optionally, the fiber laser cavity 120 includes a round-trip time of flight. The fiber laser cavity 120 further includes a standard first electro-optic modulator 150 pulsing the at least one lasing mode at a repetition rate that approximately matches the round-trip time of flight so that stimulated Brillouin scattering amplifies the at least one lasing mode circulating in the fiber laser cavity. For the purposes of this patent application, "approximately matches" means matching within 10% of the round-trip time of fight. One of ordinary skill in the art will readily appreciate that, in alternative embodiments of the invention, lower matching is possible, but causes greater losses. Optionally, the fiber laser cavity 120 further includes a standard, first non-resonant pumping circulator 160 receiving the first optical replica of the optical input signal. For the purpose of this patent application, "non-resonant pumping circulator" is a term of art, and means a circulator that does not allow resonant clockwise propagation.

Figure 3A:
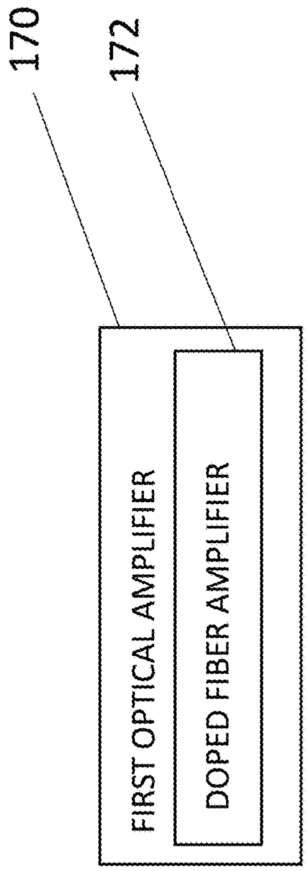
FIG. 3A is a block diagram of an optical amplifier for use in an embodiment of the invention
Figure 3B:
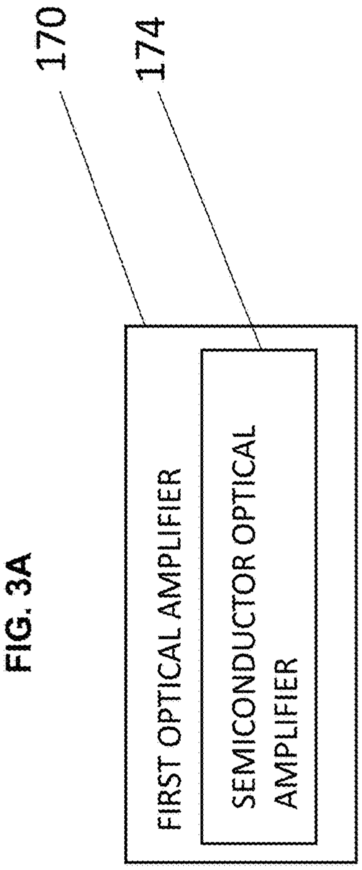
FIG. 3B is a block diagram of another optical amplifier for use in an embodiment of the invention.
Figure 4:
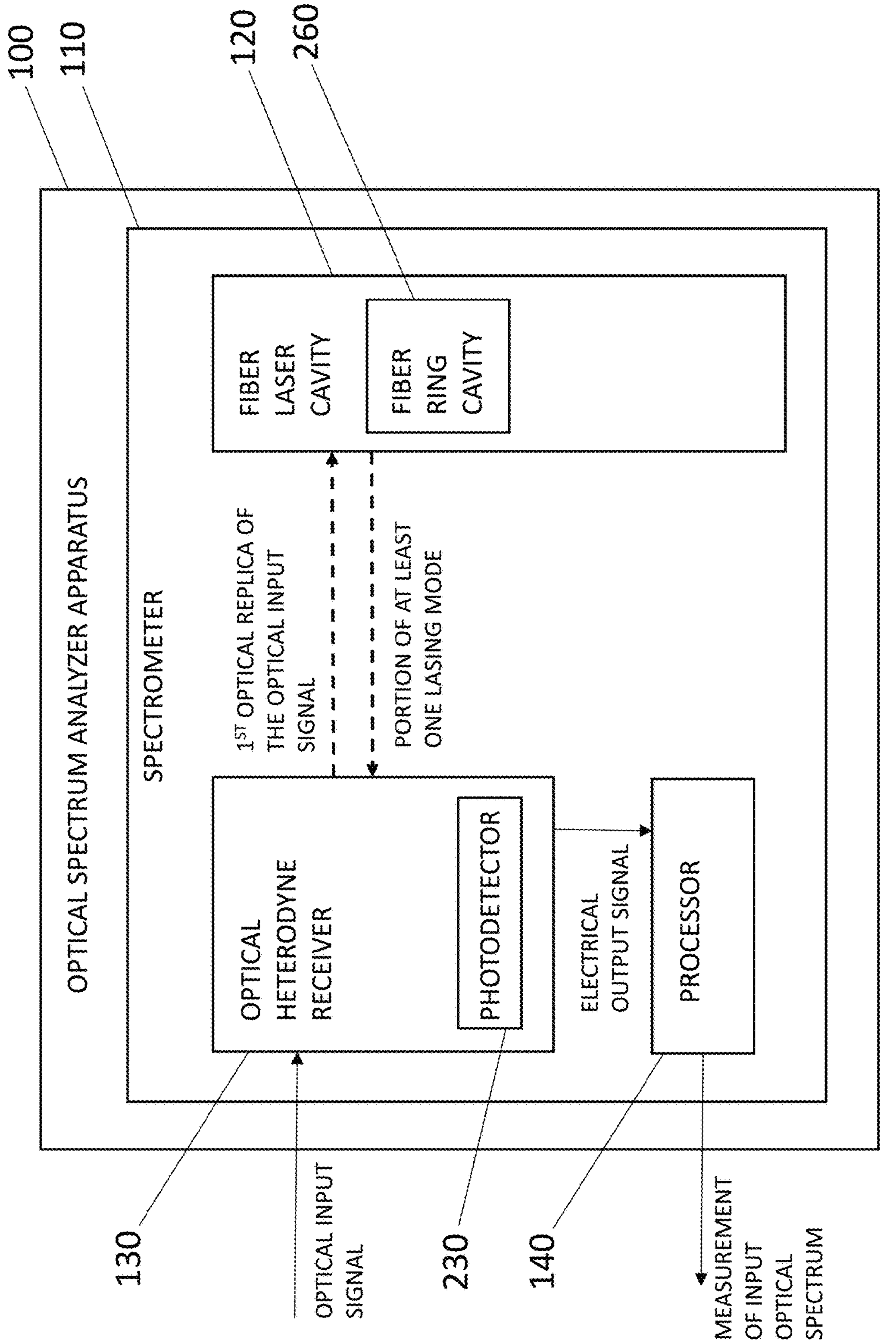
FIG. 4 is a block diagram of another embodiment of the invention.

Optionally, as shown by way of illustration in FIG. 2, the spectrometer further includes a standard, first optical amplifier 170 outside of the fiber laser cavity 120 and amplifying the optical input signal before the fiber laser cavity receives the first optical replica of the optical input signal, such as shown by way of illustration in FIGS. 2 and 4. The fiber laser cavity 120 includes a lasing threshold and the first optical replica of the optical input signal includes a power. The first optical amplifier 170 amplifies the power so that the power exceeds the lasing threshold. Optionally, as shown by way of illustration in FIGS. 3A and 3B, the first optical amplifier 170 includes a standard, doped fiber amplifier 172 or a standard semiconductor optical amplifier 174. For example, the doped fiber amplifier includes a standard erbium-doped fiber amplifier ("EDFA"). Optionally, as shown by way of illustration in FIG. 4, the fiber laser cavity 120 includes a standard, second non-resonant pumping circulator 180 operably connected to the first non-resonant pumping circulator 160; and/or a standard second optical amplifier 190 operably connected to the electro-optic modulator 150 and capable of spectral hole burning, thereby reducing gain-competition, such as shown by way of illustration in FIG. 4. One of ordinary skill in the art will readily appreciate that splitters and couplers are functionally equivalent. For example, splitter is a device that couples one input to more than one output. For example, a coupler is a device that couples more than one input to at least one output.

Optionally, as shown by way of illustration in FIG. 2, the spectrometer 110 further includes a splitter 200 operably connecting to the first optical amplifier 170 and to the optical heterodyne receiver 130. The spectrometer 110 further includes a standard first coupler 210 operably connecting the first electro-optic modulator 150 to the optical heterodyne receiver 130. Alternative embodiments of the invention include couplers pick off less than 10% of the signal in the fiber lasing cavity. Examples of such couplers include couplers with coupling ratios between 1% and 10%. Yet other embodiments of the invention include couplers that pick off more than 10% of the signal in the fiber lasing cavity; in such embodiments, because the round-trip loss is increased, more power is required for the remaining signal to hit the lasing threshold. The optical heterodyne receiver 130 includes a second coupler 220 receiving the second optical replica of the optical input signal from the splitter 200 and receiving the portion of the at least one lasing mode from the fiber laser cavity 120 via the first coupler 210. The optical heterodyne receiver 130 further includes a standard photodetector 230 operably connected to the second coupler 220. Optionally, the photodetector 230 generates photodetector output. The spectrometer 110 includes an electrical downconverter 240 operably connected to the photodetector 230 and to the processor 140. The electrical downconverter 240 electrically downshifts the photodetector output to generate the electrical output signal. In this embodiment of the invention, the input optical spectrum is used as a local oscillator ("LO"). A radio frequency ("RF") beat note is generated, when a component of the input optical spectrum is close to the output electrical spectrum (i.e., within the photodetector bandwidth).

Figure 5:
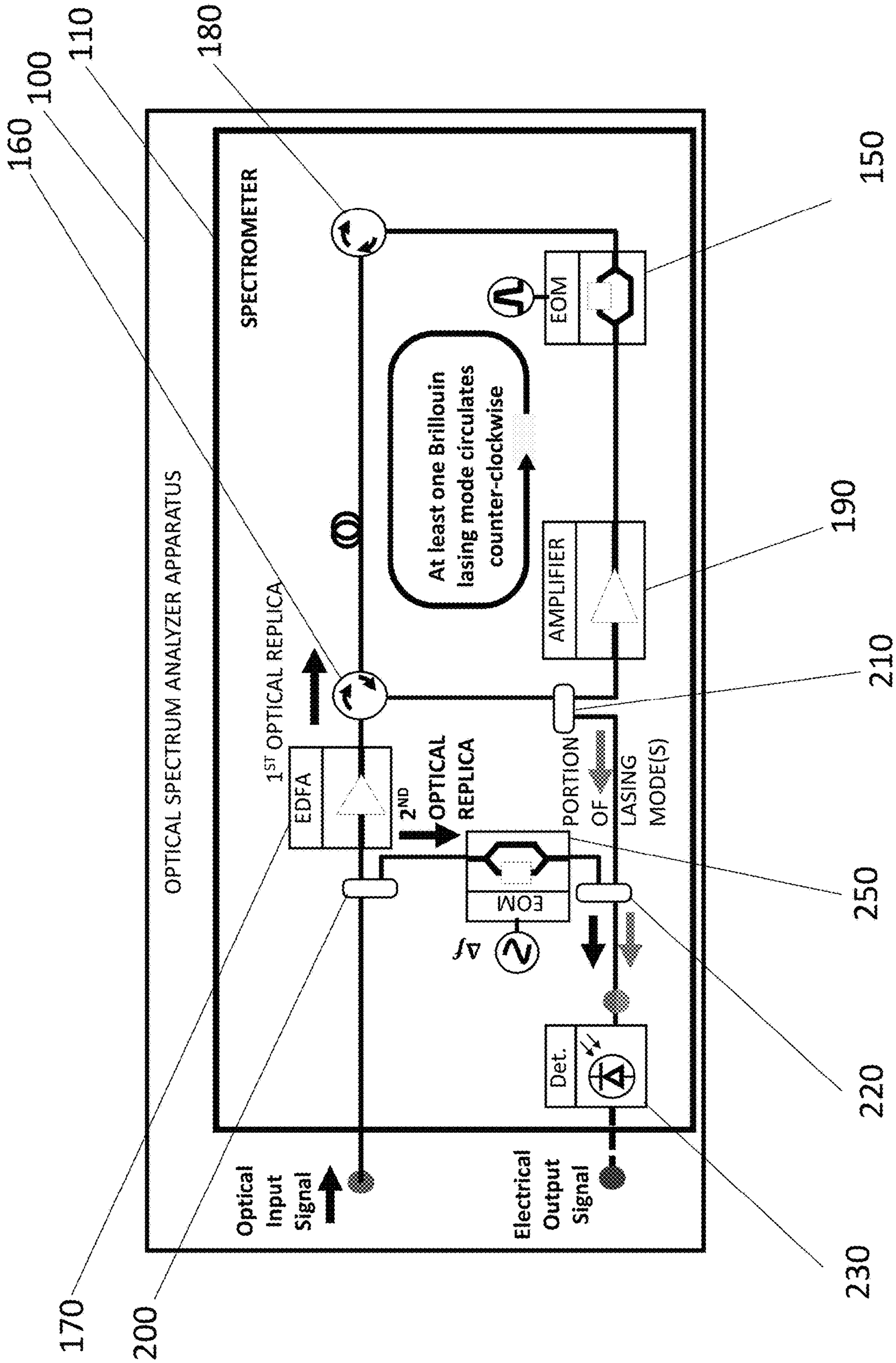
FIG. 5 is a schematic diagram of the embodiment of the invention shown in FIG. 3.

Referring, for example, to FIGS. 4 and 5, optionally, the optical heterodyne receiver 130 includes a second electro-optic modulator 250 operably connecting the splitter 200 and the second coupler 220. The second electro-optic modulator 250 downshifts the second optical replica of the optical input signal. The second electro-optic modulator transmits the downshifted second optical replica of the optical input signal to the second coupler 220.

Optionally, as shown by way of illustration in FIG. 2, the fiber laser cavity 120 comprises a fiber ring cavity 260.

Optionally, the output electrical spectrum comprises a radio frequency spectrum.

An embodiment of the invention includes a method. An optical input signal is received by an optical spectrum analyzer apparatus 100. The optical input signal includes an optical signal power and an input optical spectrum. The optical input signal is split into a first optical replica of the optical input signal and a second optical replica of the optical input signal. The first optical replica of the optical input signal is transmitted through a fiber laser cavity 120. At least one lasing mode in the fiber laser cavity is excited using the first optical replica of the optical input 120 signal. The at least one lasing mode respectively includes at least one lasing mode frequency. The at least one lasing mode frequency is offset by a respective Brillouin frequency shift from the respective at least one input frequency. A portion of the at least one lasing mode is transmitted from the fiber laser cavity 120 to an optical heterodyne receiver 130, and the second optical replica of the optical input signal is transmitted to the optical heterodyne receiver. An electrical output signal comprising an output electrical spectrum is generated. The output electrical spectrum includes a compressed replica of the input optical spectrum. One of ordinary skill in the art will readily appreciate that the output electrical spectrum of at least one practical embodiment of the invention includes one or more interfering signals such that output electrical spectrum includes, but is not an exact, compressed replica of the input optical spectrum. A measurement of the input optical spectrum is determined based on a monotonic relationship between the respective Brillouin frequency shift and the at least one input frequency. An example of such a measurement is described below.

Figure 3C:
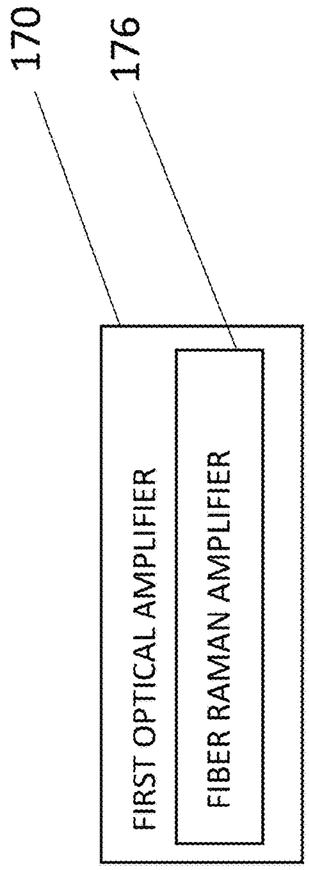
FIG. 3C is a block diagram of yet another optical amplifier for use in an embodiment of the invention.

Optionally, the fiber laser cavity 120 includes a lasing threshold, and the first optical replica of the optical input signal includes a power. The method further includes the following. A first optical amplifier 170 is provided outside of the fiber laser cavity 120. The first optical amplifier amplifies the first optical replica of the optical input signal before the fiber laser cavity 120 receives the first optical replica of the optical input signal. The power is amplified using the first optical amplifier 170 so that the power exceeds the lasing threshold. Optionally, as shown by way of illustration in FIGS. 3A-3C, the first optical amplifier 170 includes a standard, doped fiber amplifier 172, a standard semiconductor optical amplifier 174, or a standard fiber Raman amplifier ("FRA") 176. For example, the doped fiber amplifier 172 includes a standard erbium-doped fiber amplifier ("EDFA"). For example, the semiconductor optical amplifier 174 includes a standard InP/InGaAsP semiconductor optical amplifier.

Optionally, the fiber laser cavity 120 includes a round-trip time of flight and a first electro-optic modulator 150. The exciting at least one lasing mode in the fiber laser cavity using the first optical replica of the optical input signal includes the following. The at least one lasing mode is pulsed using the first electro-optic modulator 150 at a repetition rate that approximately matches the round-trip time of flight. The portion of the at least one lasing mode is transmitted to the optical heterodyne receiver, the optical heterodyne receiver receiving the second optical replica of the optical input signal. A remainder of the at least one lasing mode is passed to a first non-resonating pumping circulator 160 in the fiber laser cavity. Optionally, the fiber laser cavity 120 includes a second optical amplifier 190 operably connected to the first electro-optic modulator 150 and capable of spectral hole burning, thereby reducing gain-competition.

Optionally, the optical heterodyne receiver 130 includes a standard photodetector 230. The method further includes the following. The second optical replica of the optical input signal is downshifted at approximately the Brillouin frequency shift, such as shown by way of illustration in FIG. 5. For example, in an embodiment of the invention, "approximately the Brillouin frequency shift" entails the radio frequency ("RF") beat note between a local oscillator and its associated lasing mode falling within a bandwidth of the photodetector. The downshifted second optical replica of the optical input signal and the portion of the at least one lasing mode is coupled to the photodetector 230. The electrical output signal is output from the photodetector 230.

Optionally, the optical heterodyne receiver 130 includes a standard photodetector 230. The method further includes the following. Photodetector output is generated from the photodetector 230 based on the second optical replica of the optical input signal and the portion of the at least one lasing mode sent from the fiber laser cavity to the photodetector. The photodetector output is electrically downshifted using an electrical downconverter, thereby generating the electrical output signal.

Optionally, the fiber laser cavity 120 includes a standard fiber ring cavity 260.

Optionally, the fiber laser cavity 120 includes a standard, second non-resonating pumping circulator 180 receiving the first optical replica of the optical input signal. The second non-resonating pumping circulator 180 is operably connected to the first non-resonating pumping circulator 160.

Figure 6:
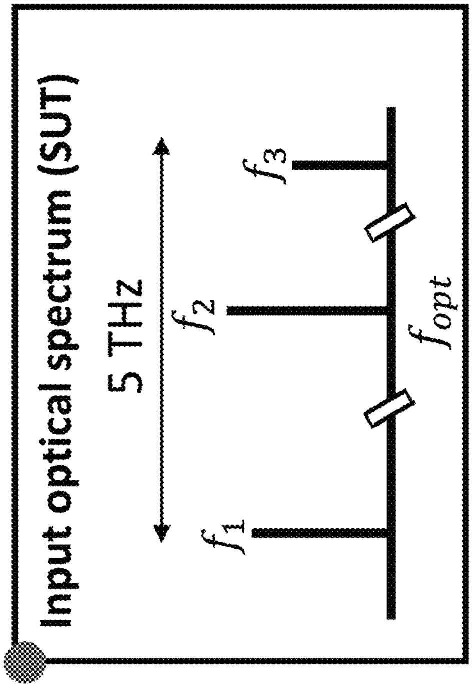
FIG. 6 is a conceptual graph of an input optical spectrum of an input optical signal received by an embodiment of the invention.
Figure 8:
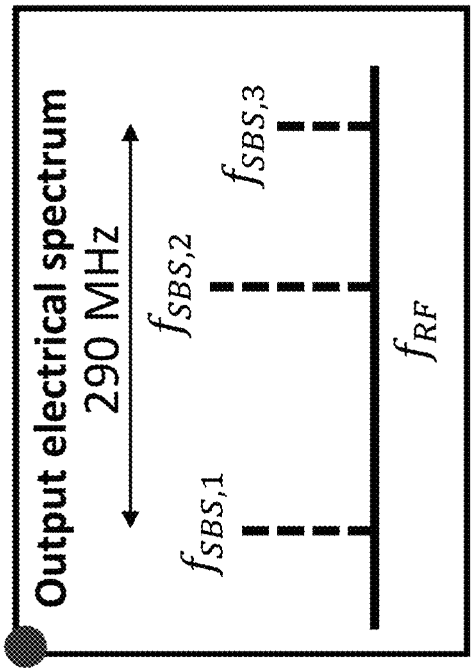
FIG. 8 is a conceptual graph of an output electrical spectrum that maps to the input optical spectrum, according to an embodiment of the invention.
Figure 9:
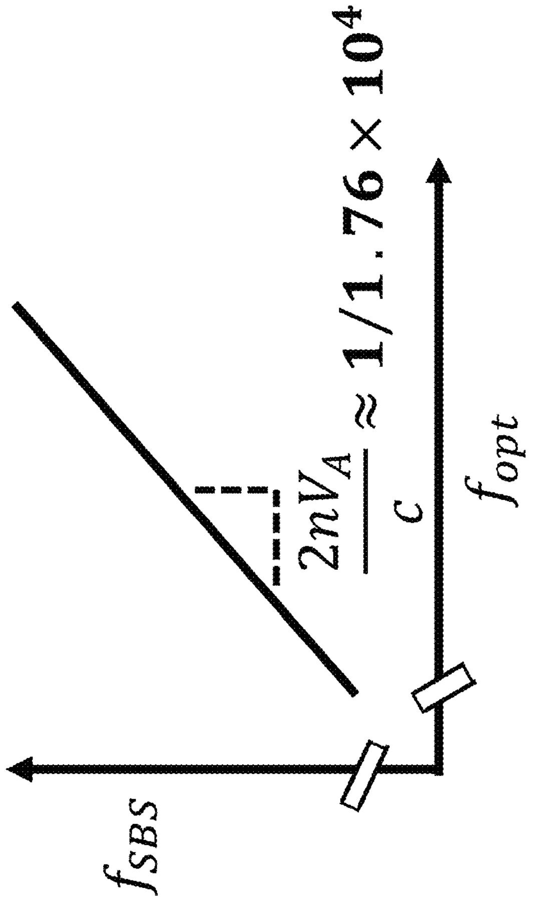
FIG. 9 is a conceptual graph of an monotonic relationship between a Brillouin frequency shift, $f_{SBS}$, and the absolute frequency of an input optical signal, $f_{opt}$, according to an embodiment of the invention.

Another embodiment of the invention includes an optical spectrum analyzer apparatus 100 and is described as follows with reference, by way of illustration, to FIGS. 4-9. The apparatus 100 takes an input optical spectrum and uses it to pump a fiber laser cavity 120. FIG. 6 conceptually shows a graph of an input optical spectrum. An electro-optic modulator ("EOM") 150 inside a fiber laser cavity 120 is pulsed with a repetition rate that matches the round-trip time of flight in the cavity. The pulsed operation breaks the cavity resonance and produces a set of pulsed lasing modes that have frequencies offset from the input spectrum by the Brillouin resonance frequency. The lasing pulses are then compared to the original input spectrum via heterodyne detection. In a monotonic relationship, the Brillouin frequency shift, $f_{SBS}$, depends approximately linearly on the absolute frequency of the input optical signal $f_{opt}$:

$$f_{SBS} \cong \frac{2n}{c} V_A f_{opt}$$

where n is the effective index of the fiber, c is the speed of light, $V_A$ is the speed of sound in the fiber and this proportionality is approximately $0.55\times10^{-4}$ Hz shift per Hz of pump frequency. Thus, each component of the input spectrum beats with lasing spectrum at a different frequency. This effectively maps/compresses the input optical spectrum to an electrical spectrum with a compression ratio of ~$1.8\times10^{-4}$. FIG. 8 is a conceptual graph of an output electrical spectrum that maps to the input optical spectrum. FIG. 9 conceptually shows the above-mentioned monotonic relationship between the Brillouin frequency shift and the frequency of the optical input signal.

To achieve this, the input optical spectrum is first split into local oscillator ("LO") and pump paths. The pump is amplified by an erbium doped fiber amplifier ("EDFA") such that the power exceeds the lasing threshold for the fiber ring cavity. The pump is then injected into the gain section of the loop via a circulator. The pump initially produces spontaneous Brillouin backscattering and stimulated Brillouin amplification of the circulating lasing modes thereafter. This provides gain to the lasing modes with a spectrum peaked at the Brillouin resonance frequency of the fiber. In our initial experiments, this section was 500 m long. At the far end of the gain fiber a second circulator removes the remaining pump light such that the pump does not resonantly interact with the cavity.

The fiber ring cavity consists of a gain section, a pickoff and an EOM. Laser pulses receive gain from the gain section and are then directed by a circulator to the lower half of the fiber ring. A 90:10 coupler splits a portion of the lasing modes off for measurement. The remaining 90% of the light then passes through the EOM. The modulator is pulsed with a repetition period that matches the round-trip time of flight for the fiber ring cavity. The light is then injected back into the gain fiber. When the round-trip loss of the beam matches the steady state gain provided by the pump, lasing can occur. Here the round-trip loss is ~7 dB thus for the 500 m the input pump power must be ~18 mW per spectral channel. Due to the input EDFA, the required incident power can be considerably lower. Note that, because the gain is proportional to the length of the fiber gain section as well as the input power, the lasing threshold could be reduced by increasing the length of the fiber at the expense of update time.

The ring cavity EOM 150, for example, produces more than one circulating pulse. The output spectral resolution of the system is transform limited (i.e., inverse of the pulse length). Thus, a single long pulse results in finer frequency steps of the output spectrum. (Note that, when measuring sparse input, the resolution is much higher and dictated by the low noise of the frequency measurement). However, using shorter pulse provides a more stable laser output. In an embodiment of the invention, the round-trip time for the cavity is ~2556 ns, and the EOM is used to carve 300 ns pulses with a repetition rate of 426 ns (resulting in a series of 6 circulating pulses).

Figure 7:
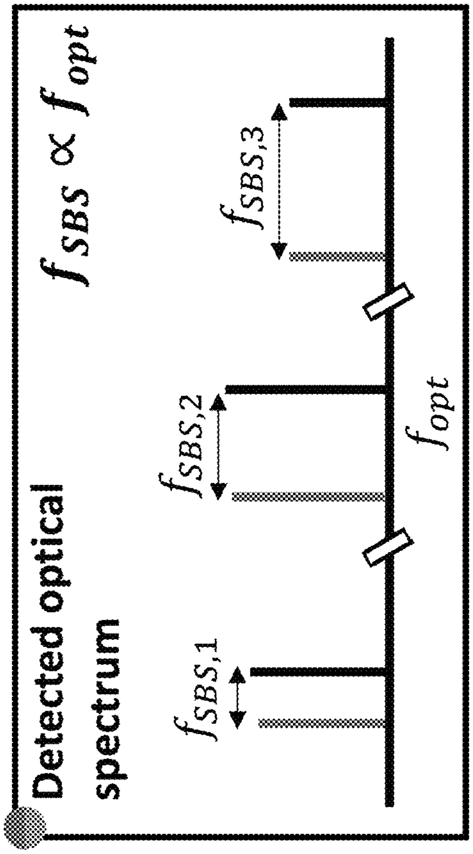
FIG. 7 is a conceptual graph of a detected optical spectrum detected by a photodetector of an embodiment of the invention.

To detect the lasing spectrum, the local oscillator and the lasing modes were combined using heterodyne detection. The LO is downshifted using an EOM driven at $f_{RF}$ where $f_{RE}$ is approximately the Brillouin frequency shift (~10.7 GHz in the polarization maintaining fiber used here). Note that this also produces a tone upshifted from the input spectrum. FIG. 7 shows a conceptual graph of the optical spectrum detected by the photodetector 230. However, this spectrum adds an additional DC offset on the detector but will not beat with the lasing spectrum since the electrical signal would fall outside of the detector bandwidth (~500 MHz). The RF beat frequency, $\Delta f_{SBS}$, is given by $\Delta f_{SBS}=f_{SBS}-f_{RF}$. The output of the detector was digitized at 1 GHz. In the general case, the electrical spectrum is recovered by fast Fourier transform ("FFT"). The electrical beat frequencies can be converted into measured optical frequencies by:

$$f_{opt} = (\Delta f_{SBS} + f_{RF}) \Big/ \left(\frac{2n}{c} V_A\right)$$

Note that, because the $2nV_A/c$ can vary from fiber to fiber, this relationship is, for example, first calibrated by measuring $f_{SBS}$ with a narrow linewidth laser of a known frequency.

In another embodiment of the invention, one or more reference lasers of known frequencies are coupled in with the input spectrum to calibrate out any variations in $2nV_A/c$. This is, for example, done continuously or by periodically switching between the signal under test and the reference laser, wherein the signal under test avoids interfering with any signal at the same frequency as this reference laser.

In another embodiment of the invention, the lasing pulses/LO are split via optical filters into multiple channels to expand the measurement range, improve precision, or reduce noise.

In another embodiment of the invention, the frequency of the LO is swept to improve the measurement range.

In another embodiment of the invention, a standard single side-band modulator is used in place of a standard intensity modulator to remove the upper sideband from the LO.

In another embodiment of the invention, other standard materials are used for the Brillouin gain material, such as specialty fibers with higher gain for a lower gain threshold or with a larger Brillouin frequency shift for better sensitivity.

In another embodiment of the invention, the lasing frequency is measured without shifting the LO. For example, the ~10 GHz RF beat signal is measured directly using, for example, a standard microwave spectrum analyzer.

Optionally, one or more portions of the invention, such as the processor 140, operate in a standard computing operating environment, for example, a desktop computer, a laptop computer, a mobile computer, a server computer, and the like, in which embodiments of the invention may be practiced. While the invention is described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, autonomous embedded computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention is described as follows. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media comprise computer storage media and communication media. Computer storage media includes non-transitory, non-volatile, removable and non-removable media implemented in any method or technology for storage of information such as computer-readable instructions, data structures, program modules or other data. Such non-transitory computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems.

The computer may also include an input/output controller for receiving and processing input from a number of other devices, including a keyboard, mouse, etc. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer-implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms “including”, “includes”, “having”, “has”, “with”, or variants thereof are used in the detailed description and/or in the claims, such terms are intended to be inclusive in a manner similar to the term “comprising”.

As used herein, the singular forms “a”, “an,” and “the” do not preclude plural referents, unless the content clearly dictates otherwise.

As used herein, the term “and/or” includes any and all combinations of one or more of the associated listed items.

As used herein, the term “about” when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being “means-plus-function” language unless the term “means” is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. A method comprising:

receiving an optical input signal, the optical input signal comprising an optical signal power and an input optical spectrum, the input optical spectrum comprising at least one input frequency;

splitting the optical input signal into a first optical replica of the optical input signal and a second optical replica of the optical input signal;

transmitting the first optical replica of the optical input signal through a fiber laser cavity;

exciting at least one lasing mode in the fiber laser cavity using the first optical replica of the optical input signal, the at least one lasing mode respectively comprising at least one lasing mode frequency, the at least one lasing mode frequency being offset by a respective Brillouin frequency shift from the respective at least one input frequency;

transmitting a portion of the at least one lasing mode from the fiber laser cavity to an optical heterodyne receiver and transmitting the second optical replica of the optical input signal to the optical heterodyne receiver;

generating an electrical output signal comprising an output electrical spectrum, the output electrical spectrum including a compressed replica of the input optical spectrum; and determining a measurement of the input optical spectrum based on a monotonic relationship between the respective Brillouin frequency shift and the at least one input frequency.

2. The method according to claim 1, wherein the fiber laser cavity comprises a lasing threshold and the first optical replica of the optical input signal comprises a power, the method further comprising:

providing a first optical amplifier outside of the fiber laser cavity and amplifying the first optical replica of the optical input signal before the fiber laser cavity receives the first optical replica of the optical input signal, and amplifying the power using the first optical amplifier so that the power exceeds the lasing threshold.

3. The method according to claim 2, wherein the first optical amplifier comprises one of a doped fiber amplifier, a semiconductor optical amplifier, and a fiber Raman amplifier.

4. The method according to claim 1, wherein the fiber laser cavity comprises a round-trip time of flight and a first electro-optic modulator, wherein said exciting at least one lasing mode in the fiber laser cavity using the first optical replica of the optical input signal comprises:

pulsing the at least one lasing mode using the first electro-optic modulator at a repetition rate that matches the round-trip time of flight;

transmitting the portion of the at least one lasing mode to the optical heterodyne receiver, the optical heterodyne receiver receiving the second optical replica of the optical input signal; and passing a remainder of the at least one lasing mode to a first non-resonating pumping circulator.

5. The method according to claim 4, wherein said fiber laser cavity comprises a second optical amplifier operably connected to the first electro-optic modulator and capable of spectral hole burning, thereby reducing gain-competition.

6. The method according to claim 1, wherein the optical heterodyne receiver comprises a photodetector, the method further comprising:

downshifting the second optical replica of the optical input signal at approximately the Brillouin frequency shift;

coupling the downshifted second optical replica of the optical input signal and the portion of the at least one lasing mode to the photodetector; and outputting the electrical output signal from the photodetector.

7. The method according to claim 1, wherein the optical heterodyne receiver comprises a photodetector, the method further comprising:

generating photodetector output from the photodetector based on the second optical replica of the optical input signal and the portion of the at least one lasing mode; and downshifting the photodetector output using an electrical downconverter, thereby generating the electrical output signal.

8. The method according to claim 1, wherein said fiber laser cavity comprises a fiber ring cavity.

9. The method according to claim 1, wherein the fiber laser cavity comprises a second non-resonating pumping circulator receiving the first optical replica of the optical input signal.

* * * * *